(12) United States Patent
Morini et al.

(10) Patent No.: US 6,541,582 B1
(45) Date of Patent: Apr. 1, 2003

(54) COMPONENTS AND CATALYSTS FOR THE POLYMERIZATION OF OLEFINS

(75) Inventors: Giampiero Morini, Padua (IT); Giulio Balbontin, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/700,382

(22) PCT Filed: Mar. 8, 2000

(86) PCT No.: PCT/EP00/02047

§ 371 (c)(1), (2), (4) Date: Nov. 14, 2000

(87) PCT Pub. No.: WO00/55215

PCT Pub. Date: Sep. 21, 2000

(30) Foreign Application Priority Data

Mar. 15, 1999 (EP) ............................................. 99200767

(51) Int. Cl.⁷ ........................... C08F 4/609; C08F 10/02; C08F 4/42

(52) U.S. Cl. ..................... 526/124.3; 526/348; 526/216; 526/124.1; 526/124.2; 526/127; 526/128; 526/158; 502/103; 502/127; 502/133

(58) Field of Search ................................ 526/348, 216, 526/124.1, 124.2, 124.3, 127, 128, 158; 502/103, 127, 133

(56) References Cited

U.S. PATENT DOCUMENTS

| | | | |
|---|---|---|---|
| 4,220,554 A | 9/1980 | Scatá et al. | 252/429 B |
| 4,298,718 A * | 11/1981 | Mayr et al. | 526/125 |
| 4,399,054 A | 8/1983 | Ferraris et al. | 252/429 B |
| 4,469,648 A | 9/1984 | Ferraris et al. | 264/9 |
| 4,495,338 A | 1/1985 | Mayr et al. | 526/125 |
| 6,204,215 B1 * | 3/2001 | Kadoi et al. | 502/103 |
| 6,235,854 B1 * | 5/2001 | Kioka et al. | 526/119 |

FOREIGN PATENT DOCUMENTS

| | | | |
|---|---|---|---|
| EP | 0045977 | 2/1982 | C08F/10/00 |
| EP | 0086643 | 8/1983 | C08F/10/00 |
| EP | 0 086 643 | * 8/1983 | |
| EP | 0086644 | 8/1983 | C08F/10/00 |
| EP | 0125911 | 11/1984 | C08F/10/00 |
| EP | 0 362 705 | * 4/1990 | |
| EP | 0395083 | 10/1990 | C08F/4/02 |
| EP | 0452156 | 10/1991 | C08F/4/651 |
| EP | 0553805 | 8/1993 | C08F/10/00 |
| EP | 0 553 806 | * 8/1993 | |
| EP | 0553806 | 8/1993 | C08F/10/00 |
| EP | 0601525 | 6/1994 | C08F/4/654 |
| JP | 11-60625 | * 3/1999 | |
| WO | 9844009 | 10/1998 | C08F/4/02 |

OTHER PUBLICATIONS

P. Theisen et al., J. Org. Chem., 58(1)142–146 (1993).
R. Holder et al., J. Org. Chem., 47(8)1445–1451 (1982).
J. March, Advanced Organic Chemistry, IV Edition (p. 468).

* cited by examiner

*Primary Examiner*—David W. Wu
*Assistant Examiner*—Ling-Siu Choi

(57) ABSTRACT

A solid catalyst component for the polymerization of olefins $CH_2=CHR$, in which R is hydrogen or a hydrocarbon radical having 1–12 carbon atoms, the solid catalyst component including Mg, Ti, halogen and an electron donor selected from β-substituted glutarates other than diisopropyl β-methyl glutarate and which are not alpha-substituted. The catalyst component, when used in the polymerization of olefins, and in particular polypropylene, is capable of providing polymers in high yield and with a high isotactic index expressed in terms of high xylene insolubility.

21 Claims, No Drawings

COMPONENTS AND CATALYSTS FOR THE POLYMERIZATION OF OLEFINS

This application is a U.S. National Stage of International application PCT/EP00/02047, filed Mar. 8, 2000, and published on Sep. 21, 2000 in the English Language.

The present invention relates to catalyst components for the polymerization of olefins, to the catalyst obtained therefrom and to the use of said catalysts in the polymerization of olefins $CH_2$=CHR in which R is hydrogen or a hydrocarbyl radical with 1–12 carbon atoms. In particular the present invention relates to catalyst components, suitable for the stereospecific polymerization of olefins, comprising Ti, Mg, halogen and an electron donor compound selected from esters of β-substituted glutaric acids (β-substituted glutarates). Said catalyst components when used in the polymerization of olefins, and in particular of propylene, are capable to give polymers in high yields and with high isotactic index expressed in terms of high xylene insolubility.

βsubstituted glutarates are known in the art. However, they have never been used as internal electron donors in catalysts for the polymerization of olefins.

EP-A45977 mentions the use of α-substituted glutarates as internal donors in catalyst components for the polymerization of olefins. The use of such compounds is not exemplified. β-substituted glutarates are not even mentioned.

In EP-A-86644 is disclosed the use of α-substituted diesters, including glutarates, as internal electron donors in catalysts for the polymerization of olefins. Diisobutyl α-methyl glutarate is specifically named but the use of such compounds is not exemplified. β-substituted glutarates are never mentioned.

The Japanese patent application Jp 11/060625 describes a catalyst component for the polymerization of olefins containing titanium, magnesium and a compound represented by the formula:

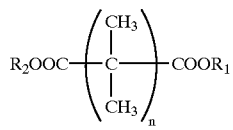

where $R^1$ and $R^2$ are hydrocarbon groups having from 1 to 20 carbon atoms, while n can be an integer from 1 to 10. In spite of this broad formula only malonates are mentioned and exemplified in the specification. Nothing is said about esters with n higher than 1.

The use of polycarboxylic acid esters, including glutarates, as internal donors in catalyst components for the polymerization of olefins, is also generically disclosed in EP 125911. Diisobutyl α-methyl glutarate and diisopropyl β-methyl glutarate are mentioned in the description although they are not exemplified. The applicant has carried out some polymerization tests employing catalyst components containing the above compounds as internal donors. As shown in the experimental section, both the catalysts gave an unsatisfactory activity/stereospecificity balance. The same poor results have been obtained with catalysts containing other α-substituted glutarates or unsubstituted glutarates.

It has been therefore very surprising to discover that, apart from diisopropyl β-methyl glutarate, the substitution in the β-position of the glutarates generates compounds that, when used as internal donors, give catalyst components having increased activity and stereospecificity with respect to the catalyst components containing α-substituted or unsubstituted glutarates as internal donors.

It is therefore an object of the present invention to provide a solid catalyst component for the polymerization of olefins $CH_2$=CHR in which R is hydrogen or a hydrocarbon radical with 1–12 carbon atoms comprising Mg, Ti, halogen and an electron donor selected from β-substituted glutarates with the proviso that diisopropyl β-methyl glutarate is excluded.

In particular, the electron donor compounds can be selected from β-substituted glutarates of formula (I):

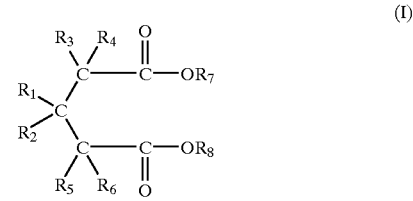

wherein the radicals $R_1$ to $R_3$ equal to or different from each other, are H or a $C_1$–$C_{20}$ linear or branched alkyl, alkenyl, cycloalkyl, aryl, arylalkyl or alkylaryl groups, optionally containing heteroatoms, and two or more of said radicals can also be joined to form a cycle, with the provisions that $R_1$ and $R_2$ are not contemporaneously hydrogen, $R_7$ and $R_8$ are different from hydrogen and diisopropyl β-methyl glutarate is excluded.

An interesting class of β-substituted glutarates is that in which $R_1$ is H and $R_2$ is selected from linear or branched $C_1$–$C_{10}$ alkyl, cycloalkyl, aryl, arylalkyl and alkylaryl groups. Preferably, $R_2$ is selected from linear or branched $C_1$–$C_{10}$ alkyls, cycloalkyl, and arylalkyl groups. Moreover, particularly good results have been obtained by using the compounds of formula (I) in which both $R_1$ and $R_2$ are different from hydrogen and are selected, in particular, from linear or branched $C_1$–$C_{10}$ alkyl, cycloalkyl, aryl, arylalkyl and alkylaryl groups.

$R_7$ and $R_8$ are preferably primary alkyl, arylalkyl or alkylaryl groups having from 1 to 10 carbon atoms. More preferably they are primary branched alkyl groups having from 1 to 8 carbon atoms. Examples of suitable $R_7$ and $R_8$ groups are methyl, ethyl, n-propyl, n-butyl, isobutyl, neopentyl, 2-ethylhexyl.

Specific examples of suitable β-monosubstituted glutarate compounds are diisobutyl 3-methylglutarate, diisobutyl 3-phenylglutarate, diethyl 3-ethylglutarate, diethyl 3-n-propylglutarate, diethyl 3-isopropylglutarate, diethyl 3-isobutylglutarate, diethyl 3-phenylglutarate, diisobutyl 3-ethylglutarate, diisobutyl 3-isopropylglutarate, diisobutyl 3-isobutylglutarate, diethyl 3-(3,3,3-trifluoropropyl) glutarate, diethyl 3-cyclohexylmethyl glutarate, diethyl 3-tertbutyl glutarate.

Specific examples of suitable β-disubstituted glutarates are: diethyl 3,3-dimethylglutarate, diisobutyl 3,3-dimethylglutarate, diethyl 3-methyl-3-isobutyl glutarate, diethyl 3-methyl-3-t-butyl glutarate, diisobutyl 3-methyl-3-isobutyl glutarate, diethyl 3-methyl-3-phenyl glutarate, diethyl 3,3-diisobutyl glutarate, diethyl 3-methyl-3-butyl glutarate, diethyl 3,3-diphenyl glutarate, diethyl 3-methyl-3-ethyl glutarate, diethyl 3,3-diethylglutarate, diethyl 3-methyl-3-isopropyl glutarate, diethyl 3-phenyl-3-n-butyl glutarate, diethyl 3-methyl-3-t-butyl glutarate, diethyl 3,3-diisopropyl glutarate diisobutyl 3-methyl-3-phenyl glutarate, diisobutyl 3,3-diisobutyl glutarate, diisobutyl 3-methyl-3-butyl glutarate, diisobutyl 3,3-diphenyl glutarate, diisobutyl 3-methyl-3-ethyl glutarate, diisobutyl 3,3-diethylglutarate, diisobutyl 3-methyl-3-isopropyl glutarate, diisobutyl 3-phenyl-3-n-butyl glutarate, diisobutyl 3-methyl-3-t-butyl glutarate, diisobutyl 3,3-diisopropyl glutarate, diethyl 3-ethyl-3 n butyl glutarate, diisobutyl 3-ethyl-3-n-butyl glutarate, diethyl 3-i-propyl-3-n-butyl glutarate, diisobutyl 3-i-propyl-3-n-butyl glutarate, diethyl 3-(2-methyl-butyl)-3-ethyl glutarate, diisobutyl 3-(2-methyl-butyl)-3-ethyl glutarate, diethyl 3-n-propyl-3-phenyl glutarate, diisobutyl 3-n-propyl-3-phenyl glutarate.

Specific examples of suitable α,β-disusbstituted glutarates are: diethyl 2-methyl-3-phenyl glutarate, diethyl 2,2-dimethyl-3-phenyl glutarate, diethyl 2-methyl-3,3-diisobutyl glutarate, diethyl 2-ethyl-3-isopropylglutarate, diisobutyl 2-methyl-3-phenyl glutarate, diisobutyl 2,4-dimethyl-3-phenyl glutarate, diisobutyl 2-methyl-3,3-diisobutyl glutarate, diisobutyl 2-ethyl-3-isopropylglutarate.

Specific examples of suitable glutarates in which the substituents $R_1$ and $R_2$ are linked to form a cycle are 9,9-bis(ethoxyacetyl)fluorene, 1,1-bis(ethoxyacetyl)cyclopentane, 1,1-bis(ethoxyacetyl)cyclohexane, 1,3-bis(ethoxycarbonyl)-1,2,2-trimethylcyclopentane.

As explained above, the catalyst components of the invention comprise, in addition to the above electron donors, Ti, Mg and halogen. In particular, the catalyst components comprise a titanium compound having at least a Ti-halogen bond, the above mentioned electron donor compound and a Mg dihalide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The preparation of the solid catalyst component can be carried out according to several methods.

According to one of these methods, the magnesium dichloride in an anhydrous state and the β-substituted glutarate are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the β-substituted glutarate is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, a β-substituted glutarate. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the β-substituted glutarate in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0,1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0,1 and 2,5. The reaction with the Ti compound can be carried out by suspending the adduct (dealcoholated or as such) in cold $TiCl_4$ (generally 0° C.); the mixture is heated up to 80–130° C. and kept at this temperature for 0,5–2 hours. The treatment with $TiCl_4$ can be carried out one or more times. The β-substituted glutarate can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA601525 and WO98/44009.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0,2 $cm^3/g$ preferably between 0,2 and 0,6 $cm^3/g$. The porosity (Hg method) due to pores with radius up to 10.000 Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the β-substituted glutarate is added during one or more of these treatments.

In any of these preparation methods the desired β-substituted glutarate can be added as such or, in an alternative way, it can be obtained in situ by using an appropriate precursor capable to be transformed in the desired electron donor compound by means, for example, of known chemical reactions such as esterification, transesterification etc. Generally, the β-substituted glutarate is used in molar ratio with respect to the MgCl$_2$ of from 0.01 to 1 preferably from 0.05 to 0.5.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1–12 carbon atoms, comprising the product of the reaction between:

(a) a solid catalyst component comprising a Mg, Ti and halogen and an electron donor selected from β-substituted glutarates with the proviso that diisopropyl β-methyl glutarate is excluded;

(b) an alkylaluminum compound and, optionally, (c) one or more electron-donor compounds (external donor).

The alkyl-Al compound (b) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external donor (c) can be of the same type or it can be different from the β-substituted glutarate. Suitable external electron-donor compounds include silicon compounds, ethers, esters such as ethyl 4-ethoxybenzoate, amines, heterocyclic compounds and particularly 2,2,6,-tetramethyl piperidine, ketones and the 1,3-diethers of the general formula (II):

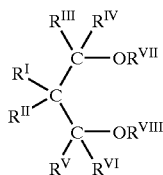

(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{III}$ are selected from C$_1$–C$_4$ alkyl radicals.

Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a C$_1$–C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-metil-dimethoxysilane and 1,1,1,trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (c) is used in such an amount to give a molar ratio between the organoaluminum compound and said electron donor compound (c) of from 0.1 to 500, preferably from 1 to 300 and more preferably from 3 to 100. As previously indicated, when used in the (co) polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples herebelow reported, the use as internal electron donors of α-substituted or unsusbstituted glutarate compounds gives worse results in term of yields and/or xylene insolubility.

Therefore, it constitutes a further object of the present invention a process for the (co)polymerization of olefins CH$_2$=CHR, in which R is hydrogen or a hydrocarbyl radical with 1–12 carbon atoms, carried out in the presence of a catalyst comprising the product of the reaction between:

(i) a solid catalyst component comprising a Mg, Ti, halogen and an electron donor selected from β-substituted glutarates with the proviso that diisopropyl β-methyl glutarate is excluded;

(ii) an alkylaluminum compound and, optionally, (iii) one or more electron-donor compounds (external donor).

The olefins cane selected in particular from ethylene, propylene, butene-1, 4-methyl-1-pentene, hexene-1, octene-1.

Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa Hydrogen or other compounds capable to act as chain transfer agents can be used to control the molecular weight of polymer.

The following examples are given in order to better illustrate the invention without limiting it.

CHARACTERIZATIONS

Preparation of Glutarates

β-substituted glutarates can be prepared by esterification of the corresponding acids. β-substituted glutaric acids can be prepared according to known methods (J.Org. Chem., 58, 142 (1993) and ibid. 47, 1445 (1982)).

α,β-disubstituted glutarates can be prepared by α-alkylation (J. March, *Advanced Organic Chemistry IV ed.*, p.468) of β-substituted glutarates.

Propylene Polymerization: General Procedure

In a 4 liter autoclave, purged with nitrogen flow at 70° C. for one our, 75 ml of anhydrous hexane containing 800 mg of $AlEt_3$, 79.8 mg of dicyclopentyldimethoxysilane and 10 mg of solid catalyst component were introduced in propylene flow at 30° C. The autoclave was closed. 1.5 Nl of hydrogen were added and then, under stirring, 1,2 Kg of liquid propylene were fed. The temperature was raised to 70° C. in five minutes and the polymerization was carried out at this temperature for two hours. The nonreacted propylene was removed, the polymer was recovered and dried at 70° C. under vacuum for three hours and, then, weighed and fractionated with o-xylene to determine the amount of the xylene insoluble (X.I.) fraction at 25° C.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

EXAMPLES

Examples 1–20 and Comparative Examples 21–26

Preparation of Solid Catalyst Components.

Into a 500 ml four-necked round flask, purged with nitrogen, 250 ml of $TiCl_4$ were introduced at 0° C. While stirring, 10.0 g of microspheroidal $MgCl_2.8C_2H_5OH$ (prepared according to the method described in ex.2 of U.S. Pat. No. 4,399,054 but operating at 3,000 rpm instead of 10,000) and 7.4 mMoles of glutarate were added. The temperature was raised to 100° C. and maintained for 120 min. Then, the stirring was discontinued, the solid product was allowed to settle and the supernatant liquid was siphoned off.

250 ml of fresh $TiCl_4$ were added. The mixture was reacted at 120° C. for 60 min and, then, the supernatant liquid was siphoned off. The solid was washed six times with anhydrous hexane (6×100 ml) at 60° C. Finally, the solid was dried under vacuum and analyzed. The type and amount of glutarate (wt %) and the amount of Ti (wt %) contained in the solid catalyst component are reported in table 1. Polymerization results are reported in table 2.

Examples 27–28 and Comparative Example 29

Into a 350 ml porcelain jar containing 4 porcelain spheres and purged with nitrogen, 12 g of anhydrous $MgCl_2$ and 21 mMoles of glutarate were introduced.

The jar was placed in a centrifugal mill operated at 350 rpm for 4 hours.

In a 500 ml four-necked round flask, purged with nitrogen, were introduced, at 0° C., 10 g of the above milled product and 250 ml of $TiCl_4$. The temperature was raised to 100° C. and maintained for 120 min. Then, the solid product was allowed to settle and the supernatant liquid was siphoned off.

250 ml of fresh $TiCl_4$ were added. The mixture was reacted at 120° C. for 60 min and then the supernatant liquid was siphoned off. The solid was washed six times with anhydrous hexane (6×100 ml) at 60° C. Finally, the solid was dried under vacuum and analyzed. The type and amount of glutarate (wt %) and the amount of Ti (wt %) contained in the solid catalyst component are reported in table 3. Polymerization results are reported in table 4.

TABLE 1

| Ex. | Glutarate | | Ti |
|---|---|---|---|
| n. | Type | Wt % | Wt % |
| 1 | Diisobutyl 3-methylglutarate | 9.5 | 2.7 |
| 2 | Diisobutyl 3-phenylglutarate | 11.2 | 2.2 |
| 3 | Diethyl 3-ethylglutarate | 9.6 | 2.4 |
| 4 | Diethyl 3-n-propylglutarate | 10.8 | 3.1 |
| 5 | Diethyl 3-isopropylglutarate | 11.7 | 2.6 |
| 6 | Diisobutyl 3-isopropylglutarate | 9.4 | 3.1 |
| 7 | Diethyl 3-isobutylglutarate | 12 | 3.4 |
| 8 | Diethyl 3,3-dimethylglutarate | 17.1 | 2.3 |
| 9 | Diisobutyl 3,3-dimethylglutarate | 19.7 | 3.1 |
| 10 | Diethyl 3-ethyl-3-methylglutarate | 11.9 | 3.1 |
| 11 | Diethyl 3-n-butyl-3-ethylglutarate | 17.9 | 3.5 |
| 12 | Diethyl 3-isopropyl-3-methylglutarate | 14.9 | 3.3 |
| 13 | Diethyl 3-isopropyl-3-n-butylglutarate | 15.4 | 4.0 |
| 14 | Diethyl 3,3-diisobutylglutarate | 16.2 | 3.8 |
| 15 | Diethyl 3-(2-methylbutyl)-3-ethylglutarate | 17 | 3.7 |
| 16 | Diethyl 3-phenyl-3-methylglutarate | 12.9 | 3.2 |
| 17 | Diethyl 3-phenyl-3-n-propyl | 17.3 | 3.9 |
| 18 | 1,1-bis(ethoxyacetyl)cyclopentane | 12.3 | 3.4 |
| 19 | 1,1-bis(ethoxyacetyl)cyclohexane | 17.5 | 3.4 |
| 20 | 1,3-bis(ethoxycarbonyl)-1,2,2-trimethylcyclopentane | 9.4 | 4.0 |
| Comp.21 | Diethyl glutarate | 13.3 | 2.5 |
| Comp.22 | Diisobutyl glutarate | 5.8 | 2.7 |
| Comp.23 | Diethyl 2-methylglutarate | 12.7 | 2.4 |
| Comp.24 | Diisobutyl 2-methylglutarate | 8.7 | 2.3 |
| Comp.25 | Diethyl 2,2-dimethylglutarate | 10.3 | 2.8 |
| Comp.26 | Diethyl 2,4-diphenylglutarate | 16.6 | 4.7 |

TABLE 2

| Example n. | Yield KgPP/gCat | X.I. Wt % |
|---|---|---|
| 1 | 24 | 97.4 |
| 2 | 23 | 97.1 |
| 3 | 21 | 97.1 |
| 4 | 22 | 97.3 |
| 5 | 19 | 98.2 |
| 6 | 27 | 97.1 |
| 7 | 35 | 97.5 |
| 8 | 37 | 98.7 |
| 9 | 43 | 98.5 |
| 10 | 25 | 97.8 |
| 11 | 25 | 98.2 |
| 12 | 40 | 98.6 |
| 13 | 27 | 98.1 |
| 14 | 61 | 98.0 |
| 15 | 33 | 98.1 |
| 16 | 30 | 98.1 |
| 17 | 46 | 97.3 |
| 18 | 20 | 97.9 |
| 19 | 31 | 98.2 |
| 20 | 32 | 96.6 |
| Comp.21 | 12 | 96.1 |
| Comp.22 | 13 | 95.9 |
| Comp.23 | 14 | 96.3 |
| Comp.24 | 13 | 96.0 |
| Comp.25 | 14 | 95.5 |
| Comp.26 | 14 | 93.3 |

TABLE 3

| Example | Glutarate | | Ti |
|---|---|---|---|
| | Type | Wt % | Wt % |
| 27 | Diethyl 3-methylglutarate | 6.5 | 1.5 |
| 28 | Diethyl 3-phenylglutarate | 7.1 | 1.6 |
| Comp.29 | Diisopropyl 3-methylglutarate | 2.5 | 3.9 |

TABLE 4

| Example | Yield (KgPP/gCat) | X.I. (Wt %) |
|---|---|---|
| 27 | 5.7 | 96.2 |
| 28 | 6.5 | 96.1 |
| Comp. 29 | 1.1 | 92.0 |

What is claimed is:

1. A solid catalyst component for the polymerization of olefins $CH_2=CHR$, in which R is hydrogen or a hydrocarbyl radical with 1–12 carbon atoms, comprising Mg, Ti, halogen and an electron donor selected from β-substituted glutarates of formula (I):

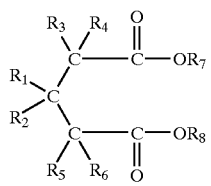

(I)

wherein the radicals $R_1$ and $R_2$, equal to or different from each other, are H or a $C_1$–$C_{20}$ linear or branched alkyl, alkenyl, cycloalkyl, aryl, arylalkyl or alkylaryl group, optionally containing heteroatoms, and two or more of said radicals can also be joined to form a cycle, with the provisions that $R_1$ and $R_2$ are not contemporaneously hydrogen, $R_3$, $R_4$, $R_5$, and $R_6$ are hydrogen, $R_7$ and $R_8$ are equal to or different from each other, and are a $C_1$–$C_{20}$ linear or branched alkyl, alkenyl, cycloalkyl, aryl, arylalkyl or alkylaryl group, optionally containing heteroatoms, and $R_7$ and $R_8$ can also be joined to form a cycle, with the proviso that diisopropyl β-methyl glutarate is excluded.

2. The solid catalyst component according to claim 1, wherein $R_1$ is H and $R_2$ is a linear or branched $C_1$–$C_{10}$ alkyl, cycloalkyl, aryl, arylalkyl or alkylaryl group.

3. The solid catalyst component according to claim 2, wherein $R_2$ is a linear or branched $C_1$–$C_{10}$ alkyl, cycloalkyl or arylalkyl group.

4. The solid catalyst component according to claim 1, wherein $R_1$ and $R_2$ are selected from linear or branched $C_1$–$C_{10}$ alkyl, cycloalkyl, aryl, arylalkyl and alkylaryl groups.

5. The solid catalyst component according to claim 4, wherein at least one of $R_1$ and $R_2$ is selected from linear or branched $C_3$–$C_{10}$ alkyl, cycloalkyl, aryl, arylalkyl and alkylaryl groups.

6. The solid catalyst component according to claim 1, wherein $R_7$ and $R_8$ are primary alkyl, arylalkyl or alkylaryl groups having from 1 to 10 carbon atoms.

7. The solid catalyst component according to claim 6, wherein $R_7$ and $R_8$ are primary branched alkyl groups having from 1 to 8 carbon atoms.

8. The solid catalyst component according to claim 6, wherein $R_7$ and $R_8$ are selected from the group consisting of methyl, ethyl, n-propyl, n-butyl, isobutyl, neopentyl and 2-ethylhexyl.

9. The solid catalyst component according to claim 1, comprising a titanium compound having at least a Ti-halogen bond, a β-substituted glutarate and a Mg halide in active form.

10. The solid catalyst component according to claim 9, wherein the titanium compound is $TiCl_4$ or $TiCl_3$.

11. The solid catalyst component according to claim 1, having a spherical form, a surface area (by B.E.T. method) between 20 and 500 m²/g, and a total porosity (by B.E.T. method) higher than 0.2 cm³/g.

12. The solid catalyst component according to claim 11, wherein said surface area is between 50 and 400 m²/g and said total porosity is between 0.2 and 0.6 cm³/g.

13. A catalyst for the polymerization of olefins $CH_2=CHR$, wherein R is hydrogen or a hydrocarbyl radical with 1–12 carbon atoms, comprising the product of the reaction between:

(i) a solid catalyst component according to claim 1;

(ii) an alkylaluminum compound and, optionally, (iii) one or more external electron-donor compounds.

14. The catalyst according to claim 13, wherein the alkyl aluminum compound (ii) is a trialkylaluminum compound.

15. The catalyst according to claim 13, wherein the external electron-donor (iii) is selected from 1,3-diethers of the general formula (II):

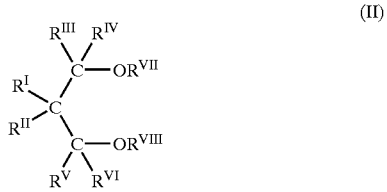

(II)

wherein $R^I$ and $R^{II}$, $R^{III}$, $R^{IV}$, $R^V$ and $R^{VI}$ equal or different to each other, hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle.

16. The catalyst according to claim 13, wherein the external electron-donor (c) is a silicon compound of formula $R_a^5 R_b^6 Si(OR^7)_c$, where a and b are integer from 0 to 2, c is an integer from 1 to 4 and the sum (a+b+c) is 4; $R^5$, $R^6$ and $R^7$ are alkyl, cycloalkyl or aryl radicals with 1–18 carbon atoms optionally containing heteroatoms.

17. The catalyst according to claim 16, wherein a is 1, b is 1 and c is 2.

18. The catalyst according to claim 16, wherein $R^5$ and/or $R^6$ are branched alkyl, cycloalkyl or aryl groups with 3–10 carbon atoms optionally containing heteroatoms and $R^7$ is a $C_1$–$C_{10}$ alkyl group.

19. The catalyst according to claim 18, wherein $R^7$ is methyl.

20. A process for the (co)polymerization of olefins $CH_2=CHR$, in which R is hydrogen or a hydrocarbyl radical with 1–12 carbon atoms, carried out in the presence of a catalyst of claim 13.

21. In a process for preparing an olefin polymerization catalyst comprising a Ti compound, a Mg compound and an electron donor, the improvement comprising using a β-substituted glutarate of formula (I) as electron donor:

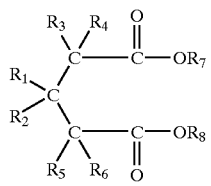

(I)

wherein the radicals $R_1$ and $R_2$, equal to or different from each other, are H or a $C_1$–$C_{20}$ linear or branched alkyl, alkenyl, cycloalkyl, aryl, arylalkyl or alkylaryl group, optionally containing heteroatoms, and two or more of said radicals can also be joined to form a cycle, with the provisions that $R_1$ and $R_2$ are not contemporaneously hydrogen, $R_3$, $R_4$, $R_5$, and $R_6$ are hydrogen, $R_7$ and $R_8$ are equal to or different from each other, and are a $C_1$–$C_{20}$ linear or branched alkyl, alkenyl, cycloalkyl, aryl, arylalkyl or alkylaryl group, optionally containing heteroatoms, and $R_7$ and $R_8$ can also be joined to form a cycle, with the proviso that diisopropyl β-methyl glutarate is excluded.

* * * * *